US008817659B2

(12) United States Patent
Nieuwland et al.

(10) Patent No.: US 8,817,659 B2
(45) Date of Patent: Aug. 26, 2014

(54) NETWORK MODE SWITCHING METHOD AND SERIAL DATA COMMUNICATION NETWORK

(75) Inventors: Andre Krijn Nieuwland, Waalre (NL); Jan Staschulat, Steinhagen (DE); Elisabeth Francisca Maria Steffens, Eindhoven (NL); Hubertus Gerardus Hendrikus Vermeulen, Eindhoven (NL)

(73) Assignee: NXP B.V., Eindhoven (NL)

( * ) Notice: Subject to any disclaimer, the term of this patent is extended or adjusted under 35 U.S.C. 154(b) by 466 days.

(21) Appl. No.: 12/975,097

(22) Filed: Dec. 21, 2010

(65) Prior Publication Data
US 2011/0194458 A1  Aug. 11, 2011

(30) Foreign Application Priority Data
Dec. 21, 2009 (EP) ..................... 09180208

(51) Int. Cl.
*H04L 12/28* (2006.01)
*H04L 12/40* (2006.01)

(52) U.S. Cl.
CPC . *H04L 12/40169* (2013.01); *H04L 2012/40273* (2013.01); *H04L 2012/40241* (2013.01)
USPC ........... 370/254; 370/321; 370/442; 709/221; 709/222; 701/1

(58) Field of Classification Search
USPC ......... 370/254, 442, 347, 337, 321–324, 458; 709/220–222; 701/1, 2, 29, 33, 36; 455/418–420, 423; 718/100–104
See application file for complete search history.

(56) References Cited

U.S. PATENT DOCUMENTS

2002/0081978 A1* 6/2002 Hou et al. ..................... 455/67.1
2007/0081473 A1* 4/2007 Jiang ............................. 370/254

FOREIGN PATENT DOCUMENTS

DE    103 39 421 A1    4/2005

OTHER PUBLICATIONS

FlexRay Requirements Specification version 2.1, Dec. 2005.*
Brendle, R., et al. "Dynamic Reconfiguration of FlexRay Schedules for Response Time Reduction in Asynchronous Fault-Tolerant Networks," Architecture of Computing Systems A ARCS, pp. 117-129 (Feb. 25, 2008).
Extended European Search Report for European Patent Appln. No. 09180208.2 (Apr. 20, 2010).

* cited by examiner

*Primary Examiner* — Man Phan
*Assistant Examiner* — Mandish Randhawa

(57) ABSTRACT

Disclosed is a method of switching modes in a serial data communication network comprising a plurality of interconnected nodes, each of said nodes comprising a plurality of mode-dependent configurations, the method including, during a first mode, issuing an instruction to said nodes, said instruction identifying a next mode of the data communication network; terminating said first mode; and following said termination, reconfiguring each of said nodes in accordance with the configuration corresponding to said next mode identified by said instruction. A serial data communication network implementing such a method is also disclosed.

19 Claims, 3 Drawing Sheets

NETWORK MODE SWITCHING METHOD AND SERIAL DATA COMMUNICATION NETWORK

This application claims the priority under 35 U.S.C. §119 of European patent application no. 09180208.2, filed on Dec. 21, 2009, the contents of which are incorporated by reference herein.

FIELD OF THE INVENTION

The present invention relates to a method of switching modes in a serial data communication network comprising a plurality of interconnected nodes.

The present invention further relates to a serial data communication network comprising a plurality of interconnected nodes.

BACKGROUND OF THE INVENTION

In the automotive industry, the increasing complexity of vehicles, e.g. cars, has pushed the boundaries of vehicle control architectures. Less than a decade ago, many vehicles made use of CAN (controller area network). However, since CAN is based on an event-driven communication approach, which means that every node of the network must be able to access the common communication medium, e.g. a bus, at any time. This can cause data conflicts (collisions) on the network, especially in vehicles having a large number of nodes. Because there is no strict schedule in an event-driven communication system, adding and removing bus nodes affects the communication flow. Strictly speaking, such changes make it necessary to comprehensively revalidate the entire system. Consequently, event-driven communication systems lack composability.

In addition, CAN communication technology cannot fulfill the high requirements for fault tolerance due to its lack of redundant structures and mechanisms and can also only deliver a maximum data rate of 500 kbit/s in serial communications. With the aforementioned increasing complexity translating into an increase of network nodes, CAN communication technology is no longer considered suitable to deliver fault-tolerant data communication between nodes in a vehicle network at sufficient data transfer rates.

This realization has led to the development of the so-called FlexRay™ network, has been schematically shown in FIG. 1. The FlexRay™ network 10 utilizes a time-divisional multiple access (TDMA) schedule, which means that the nodes 100 are assigned time slots for accessing the network 10. Each node 100 typically consists of a set of electronic control units (ECU) 102 with FlexRay™ communication controllers 104. Each communication controller 104 connects the ECU 100 to one or more communication channels 120a, 120b via a corresponding bus driver 106a, 106b. For instance, the bus driver 106a connects to the physical layer of the communication channel 120a and can contain a guardian unit that monitors the TDMA access of the controller. Multiple communication channels 120a, 120b may be used to introduce redundancy, thus improving the fault tolerance of the network 10. Each of the communication channels 120a, 120b may be mapped onto a separate single bus, although more complex implementations such as active or passive star configurations are also feasible.

In a TDMA network such as FlexRay, it is of course of utmost importance that all nodes 100 operate in a synchronized manner, i.e. start their cycles and time slots at substantially the same point in time, to ensure that each node 100 attempts to access the data communication channel 120a, 120b at the correct point in time. This close synchronization is important to guarantee that nodes broadcast their data onto the bus only in the time slots assigned to them, and to guarantee that they read data from the bus at those slots in which there data may have been made available to such nodes. The loss of synchronization may also cause conflicts between read and write actions on communication channels. Maintaining synchronized operation is not a trivial exercise as the nodes 100 are typically controlled by a local clock. The network 10 is typically initialized by a power-up.

Moreover, the TDMA schedules of the respective nodes 100 are typically developed at design time, at which stage all scenarios or use-cases of the vehicle must be taken into consideration, including firmware upgrades of the ECUs 102. This is because no robust global control mechanism exists that allows fail-safe switching between use-cases in a synchronized manner. As such firmware upgrades may require relatively large amounts of data to be communicated to an ECU 102, the TDMA schedules typically must contain a large percentage of time slots assigned to such upgrades to avoid that such an upgrade would take up an excessive amount of time, even though such upgrades will be rare, e.g. when the vehicle is being serviced.

For instance, it has been reported that for a recent model of a high-end car including a FlexRay™ network, 50% of all time slots in the TDMA schedules have been assigned to such upgrades. It will be clear that such a large allocation of time slots severely reduces the available bandwidth for the remaining communications over the network.

SUMMARY OF THE INVENTION

The present invention seeks to provide a robust method of switching modes in a serial data communication network comprising a plurality of interconnected nodes.

The present invention further seeks to provide a serial data communication network comprising a plurality of interconnected nodes that has improved bandwidth utilization.

In accordance with an aspect of the present invention, there is provided a method of switching modes in a serial data communication network comprising a plurality of interconnected nodes, each of said nodes comprising a plurality of mode-dependent configurations, the method comprising during a first mode, issuing an instruction to said nodes, said instruction identifying a next mode of the data communication network; terminating said first mode; and following said termination, reconfiguring each of said nodes in accordance with the configuration corresponding to said next mode identified by said instruction.

Hence, the present invention has been based on the insight that an instruction may be inserted into the communications between nodes of a network such as a FlexRay™ network, which identifies the next mode of the network. This for instance allows the definition of multiple TDMA schedules at design time, e.g. different TDMA schedules for different use-cases, such that the available bandwidth over the network per use-case can be maximized as the bandwidth no longer needs sharing with other use-cases.

For instance, advantageously, the next mode is a programming mode for programming of said nodes, such that firmware upgrades may be done during such a special programming mode which has its TDMA schedule optimized for the time slots for reprogramming, thereby facilitating a significant increase in the bandwidth of other modes in which the programming time slots no longer need including.

In a preferred embodiment, issuing said instruction comprises broadcasting said instruction at least once, such that it is ensured that all nodes receive the instruction. Alternatively, the instruction may be (repeatedly) transmitted over the network to individual nodes until all nodes have received the instruction.

In case of a TDMA network, the respective TDMA schedules may comprise a time slot dedicated to the issuance of said instruction.

In case of a FlexRay™ network, the instruction may be embedded in a FlexRay™ symbol or in a network management vector.

In an embodiment, the instruction comprises instruction bits as well as error-protection bits, e.g. cyclic redundancy check bits or an error correction code, to improve the fault tolerance of the instruction.

Each of said nodes may comprise an internal memory, with the method further comprising for each of said nodes receiving said instruction, storing said instruction into the internal memory, wherein the step of reconfiguring each of said nodes comprises reading said instruction from the internal memory to identify the appropriate mode-dependent configuration. Any suitable memory, such as a flash memory or RAM depending on the type of restart, e.g. full or partial power-down of the network, wake-up of the network from a sleep mode and so on, may be used for this purpose.

In accordance with another aspect of the present invention, there is provided a serial data communication network comprising a plurality of interconnected nodes, at least some of said nodes comprising a plurality of mode-dependent configurations, wherein said nodes are adapted to receive an instruction during a first mode of said network, said instruction identifying a next mode of the said network: and, upon a (re-)start of the network, initialize by loading the configuration as identified in said instruction. Such a network benefits from being able to switch between different modes, e.g. use-cases, despite the network lacking a central controller for synchronized configuration of the network nodes.

In an embodiment, the nodes each comprise an internal memory for storing the instruction during said first mode. By storing the instruction for retrieval upon initialization, e.g. after a restart or power-down of the network, the correct configuration can simply be selected by each node at power-up by evaluating the instruction stored in its memory.

Advantageously, the serial data communication network is a TDMA network such as a FlexRay™ network, wherein each of the mode-dependent configurations comprise a TDMA schedule for indentifying the time slots in which the corresponding node has been granted access to the data communication network during said mode.

The serial data communication network of the present invention may be advantageously integrated into a vehicle, e.g. a car, where it can be used to improve the available bandwidth for data communications between ECUs.

DESCRIPTION OF THE DRAWINGS

Embodiments of the invention are described in more detail and by way of non-limiting examples with reference to the accompanying drawings, wherein FIG. 1 schematically depicts a FlexRay™ network.

DESCRIPTION OF THE EMBODIMENTS

Figure 1:
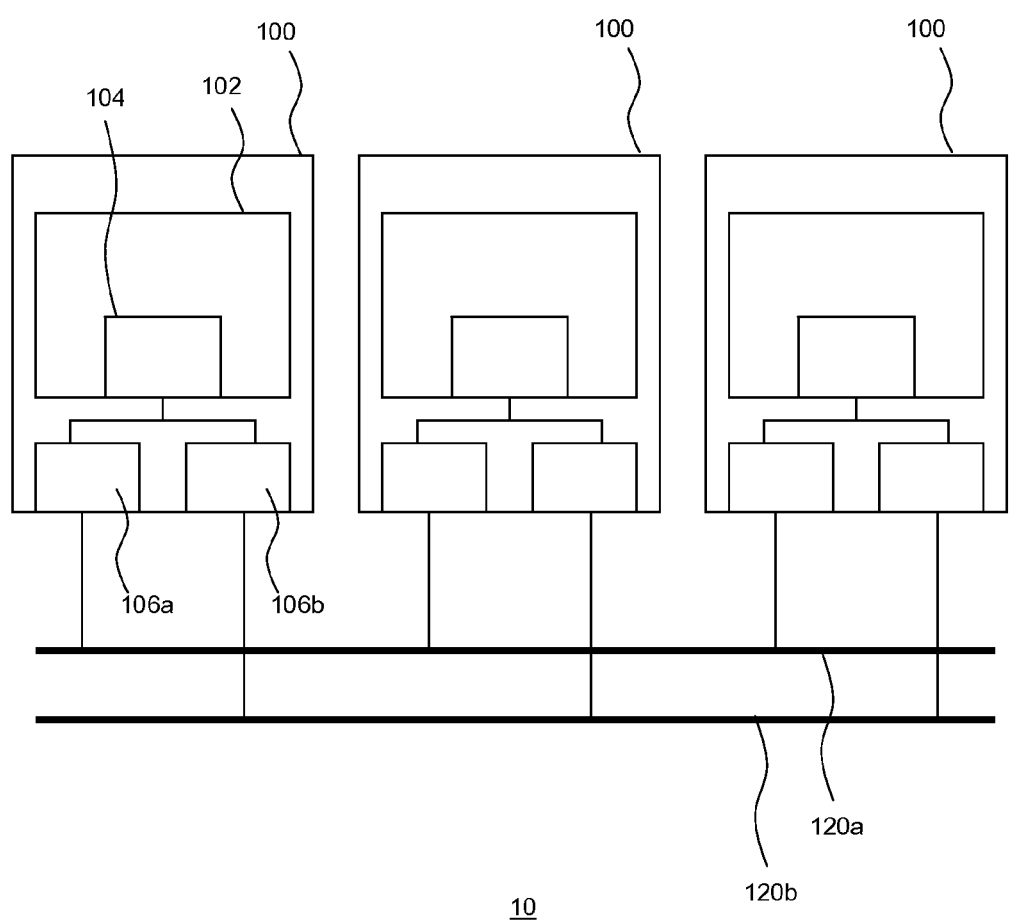

It should be understood that the Figures are merely schematic and are not drawn to scale. It should also be understood that the same reference numerals are used throughout the Figures to indicate the same or similar parts.

Figure 2:
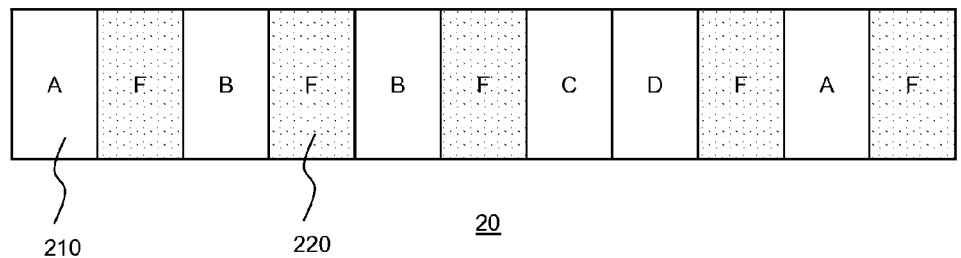
FIG. 2 schematically depicts a TDMA schedule for a FlexRay™ network.

FIG. 2 shows a simplified example of a TDMA schedule 20 for a TDMA data communication network such as the FlexRay™ network 10 of FIG. 1. The schedule 20 comprises a number of time slots 210 and 220, with time slots 210 being assigned to nodes A-D and dotted time slots 220 being assigned to a (flash) programming cycle F. The programming cycle is typically used to update the firmware of the ECUs or nodes 110. As previously explained, such updates typically take part during vehicle maintenance, which can be as infrequent as once every two years during routine servicing of the vehicle.

Nevertheless, due to the fact that the current version of the FlexRay™ network 10 does not facilitate the initialization of nodes 110 in e.g. a dedicated ECU programming mode, the TDMA schedule 20 must allocate sufficient time slots 220 to the flash programming mode F to ensure that when such a programming cycle is required, this cycle can be completed without undue latency caused by limited bandwidth having been assigned to this programming cycle. Consequently, during normal operation of the vehicle, many time slots in the TDMA schedule 20 of FIG. 2 remain unused, as they have been reserved for this programming mode. This detrimentally affects the available bandwidths to nodes A-D in this example.

It is pointed out that for instance in case of a FlexRay™ network 10, the TDMA schedule 20 may comprise so-called static slots and dynamic slots. Static slots are typically assigned to deterministic, synchronous communications whereas dynamic slots are made available for event-driven, asynchronous communications. In a FlexRay™ network, the presence of dynamic slots is optional in a TDMA schedule 20.

In general terms, the present invention enables a data communication network, and in particular a TDMA network to switch between different communication configurations, and in particular to switch between communication schedules in a safe manner. The present invention is particularly designed for wired data communication networks having limited hierarchy, and in particular wired TDMA networks in which the nodes of the network cannot be configured centrally.

It is however pointed out that the present invention may also be advantageously used in wireless TDMA networks, for instance for switching between modes, e.g. for supporting a large download or a central broadcast to all network nodes, e.g. cell phones. In such scenarios, it is advantageous to assign the data providing node an increased number of slots compared to the standard service schedule to ensure that the schedule may return to the standard service schedule as quickly as possible, thus limiting the duration of reduction in quality of service to nodes with a reduced number of assigned time slots during the special mode.

Figure 3:
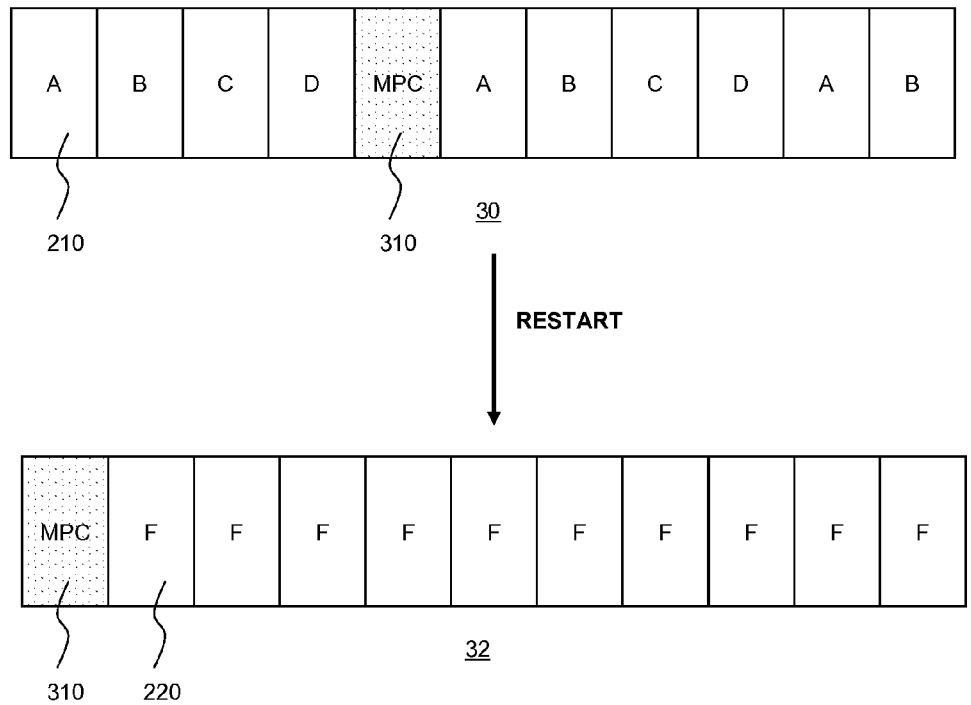
FIG. 3 schematically depicts a TDMA schedule for a FlexRay™ network in accordance with an embodiment of the present invention.

FIG. 3 depicts a TDMA schedule 30 of a communication cycle for a TDMA network such as the FlexRay™ network that has been generated in accordance with an embodiment of the method of the present invention. The TDMA schedule 30 has been compiled in accordance with a first use case for the TDMA data communication network such as the FlexRay™ network 10, in which nodes A-D have been assigned time slots 210 in the TDMA schedule 30. Each node 100 contains a (partial) copy of the TDMA schedule 30 such that the node 100 can identify the time slots 210 in which it has been given access to the data communication channel(s) 120a, 120b. In addition, the TDMA schedule 30 comprises a time slot 310 in which an instruction, a so-called Mode Preset Command (MPC), may be issued. In FIG. 3, a single slot 310 is shown by way of non-limiting example only. The TDMA schedule 30 preferably may comprise a single time slot 310 in which the MPC is broadcasted to all nodes 100, or alternatively multiple time slots 310 in which the MPC is sent to individual nodes 100. In the latter embodiment, the TDMA schedule 30 will contain sufficient time slots 310 to allow the transmission of the MPC to all nodes 100.

In an embodiment, time slots may also be reserved (not shown) for acknowledgements of receipt of the MPC by the nodes 100. Such acknowledgements may for instance be readily inserted into a dynamic segment of the communication cycle as such segments are intended for event-driven communications.

The MPC, which may be transmitted in a static or dynamic segment 310, informs the nodes 100 which TDMA schedule to select at the next restart. As previously explained, such a restart may be triggered by a power-down and subsequent power-up of the data communication network 10. The nodes 100 may be adapted to contain a memory (not shown) for storing the MPC upon receiving the MPC in a time slot 310, after which the nodes 100, upon power-up, will check the memory to determine which TDMA schedule needs to be selected. Typically, each node 100 will have access to a plurality of such TDMA schedules, each of which may correspond to a particular (use-case) configuration of the data communication network 10. The MPC typically acts as an identifier of one of such TDMA schedules, thereby ensuring that all nodes 100 select the same TDMA schedule upon initialization, e.g. after a restart triggered by e.g. a network wake-up or reboot. It will be understood that although the above has been explained in the context of a single network 10, the present invention is equally applicable to individual domains of network architectures comprising multiple domains, such as partial networks within a network cluster.

The MPC may be removed from the memory once the restart, which may for instance be caused by the network 10 terminating a communication mode, waking up or rebooting, has taken place. Preferably, the MPC is overwritten once a more updated and valid MPC has been received, e.g. in a next communication mode.

For instance, as shown in FIG. 3, the MPC in TDMA schedule 30 may trigger the nodes 100 to select TDMA schedule 32 upon restart, in which the (flash) programming mode for one or more ECUs 102 is selected. The TDMA schedule 32 may also comprise a time slot 310 reserved for issuing a MPC. It is pointed out that the time slot 310 in TDMA schedule 32 is placed at the beginning of the schedule by way of non-limiting example only. It may for instance be advantageous to place the time slot 310 at the end of the TDMA schedule 32 to signal the completion of the programming of the one or more ECUs 102. Alternatively, the MPC may be omitted from TDMA schedule 32, which may trigger the nodes 100 to configure into a default mode upon restart. In this case, the MPC should be removed from the internal memory of the nodes 100, following the initial restart causing TDMA schedule 32 to be selected.

In a preferred embodiment, the MPC is issued (broadcasted) in the same time slot in different TDMA schedules. This has the advantage that if for some reason a MPC not been received by a node 100, thus causing a faulty restart of the network 10 with different nodes 100 using different TDMA schedules, the incorrect initialization of the network 10 may be rectified at the next restart simply by broadcasting another MPC, e.g. by a network maintenance node 100, as all nodes 100, despite operating incompatible TDMA schedules, still expect the broadcast of a MPC during the same time slot.

The MPC instruction may be generated by individual nodes 100 in several ways. For instance, an ECU 102 may be connected to an external device, e.g. an external programming device connected to a vehicle during a vehicle service, which triggers its node 100 to issue a MPC indicating to the network 10 that a programming cycle has to be entered. Alternatively, the node 100 may issue a MPC upon detection of a predefined condition or state switch by its ECU.

In addition, the network 10 may comprise a node 100 responsible for carrying out network management tasks, e.g. an ECU 102 which executes a software program for network control purposes, and which may decide whether the network 10 may go to a sleep mode or should be kept active because there are still some nodes 100 requesting communication. Such a network management node 100 may be responsible for periodically issuing MPCs to specify the next communication mode of the network 10.

At this point, it is noted that in case of multiple nodes 100 being capable of sending a MPC during the same communication mode, such as one or more ECUs 102 connected to an external device in addition to a network management node 100, it may be necessary to prioritize such MPCs to avoid the risk of some of the nodes 100 of the network 10 initializing to a different communication mode upon a restart of the network 10. Any suitable prioritization method may be used for this purpose. For instance, a MPC may have a priority score, with the local memory of the nodes 100 being adapted to store multiple MPCs, with each node 100 being adapted to select the MPC having the highest priority score.

Alternatively, the nodes 100 may be assigned a time slot in the TDMA schedule as a function of priority, i.e. nodes 100 capable of issuing a high-priority MPC receiving a TDMA slot early in the schedule with nodes 100 capable of issuing lower priority MPCs receiving a TDMA slot later in the schedule, with each node 100 being prohibited to broadcast its MPC as soon as a MPC has been broadcasted in a communication mode, e.g. by setting a flag in each node 100 that a MPC has been broadcasted during the present communication mode. This ensures that in case of multiple nodes 100 wanting to issue a MPC during a communication mode, only the highest priority MPC is actually issued. It should be appreciated that in such an embodiment, the TDMA schedule will contain multiple time slots assigned to MPC broadcasts, with each slot being assigned to a specific node.

In yet another embodiment, the nodes 100 may be assigned a time slot in the TDMA schedule as a function of inverse priority, i.e. nodes 100 capable of issuing a high-priority MPC receiving a TDMA slot late in the schedule with nodes 100 capable of issuing lower priority MPCs receiving a TDMA slot earlier in the schedule. In such a scenario, the nodes 100 may for instance be adapted to overwrite an earlier received MPC, thus ensuring that all nodes 100, at the termination of a communication mode, contain the same highest priority MPC. In this embodiment, overwritten MPCs will need reissuing during a next communication cycle. Alternatively, the nodes 100 store all issued MPCs on a stack, such that the last received, highest priority MPC is taken first from the stack upon a restart of the network 10.

It may be advisable to assign priorities to MPC as a function of the inverse of the frequency of occurrence of the MPC to avoid starvation of some communication modes. In other words, frequently occurring communication modes should be given a low priority to ensure that when a very infrequent communication mode such as a programming mode tries to load onto the network 10, this infrequent mode does not run the risk of being prevented from doing so by more commonly occurring communication modes. For this reason, it is preferably to give the MPC issued by a network maintenance node 100 a low priority score, as this MPC is likely to be frequently issued.

It is pointed out for the sake of completeness that the various communication modes as depicted by TDMA schedules 30 and 32 do not have to contain well-defined time slots 210 and 220. As previously explained, the FlexRay™ network also allows for the definition of dynamic segments, which have a well-defined duration but allow for more flexible (asynchronous) communication within such a segment. One or more communication modes, e.g. the ECU programming mode, may be defined at least partially or even fully in terms of such dynamic segments.

In a TDMA data communication network 10 such as the FlexRay™ network, the time slots such as time slots 210 and 220 typically have a maximum length in terms of the number of bits that can be communicated during each time slot. For instance, in the FlexRay™ network, uniform message frames include a 40-bit header part, a payload part containing a maximum of 254-bit data to be communicated and a trailer containing cycle redundancy check (CRC) bits. In an embodiment, the MPC forms part of such a message frame, or other frames that may be communicated as set times in for instance a dynamic segment of a TDMA schedule, such as a FlexRay™ network management vector. This can be achieved because the MPC will only require a few bits to identify the next mode of the network. Alternatively, the MPC may be embedded in a FlexRay™ symbol to be issued during the optional symbol window, which is typically used to send special symbols, e.g., wakeup, startup, and alarm symbols to the nodes 100 at the end of a communication cycle, e.g. during network idle time.

The MPC may further comprise additional bits, e.g. CRC bits or other error correction code bits to improve the fault tolerance of the MPC. In such an embodiment, the nodes 100, e.g. the communication controllers 104 typically are adapted to check and/or ensure the correctness of the MPC using such additional bits before storing the MPC for later use. Such techniques are known per se and therefore not explained in further detail for reasons of brevity only.

The main advantage of the use of the MPC in accordance with the method of the present invention is that due to the fact that communication cycles and programming cycles no longer need to be interleaved in a single cycle, shorter TDMA cycles, i.e. more compact TDMA schedules, can be achieved, because the individual nodes 100 in a normal communication cycle such as the cycle depicted by TDMA schedule 30 are given more bandwidth compared to the prior art TDMA cycle 20, in which the bandwidth in the cycle had to be divided between the communication time slots 210 and the programming time slots 220.

In an embodiment, the time slot 310 may be used to transmit an instruction triggering the nodes 100 to restart in their default mode unless or until the request for the transmission of a MPC instruction is received. This ensures that, unless a MPC instruction for triggering the nodes 100 to restart into a 'special' mode such as the ECU programming mode, all nodes 100 always restart into their default mode, thus ensuring that inconsistent network states are avoided, e.g. following the accidental shutdown of individual nodes or branches of the network. This instruction may for instance be a MPC issued by a network maintenance node 100 as previously explained. In case no MPC is issued during a communication mode, the nodes 100 may simply reuse to the most recently stored MPC upon the next restart, or, in case of nodes 100 storing multiple MPCs, proceed to the next, e.g. lower priority, MPC, as previously explained.

The MPC may simply be used to toggle the state of the serial data communication network 10 between a normal communication mode and a ECU programming mode as shown in FIG. 3. However, it should be appreciated that additional MPCs may be used, for instance to bring the serial data communication network 10 into different types of communication modes, e.g. use-cases. For instance, for a FlexRay™ network 10 in a vehicle, the driver of the vehicle may trigger the generation of the use-case MPCs to force the FlexRay™ network 10 into different modes. For example, a driver putting the vehicle in reverse may trigger the selection of a use-case in which a node 100 associated with a rear-view camera is given additional bandwidth, i.e. more time slots in the TDMA schedule.

In an embodiment, the network 10 may be switched to a dedicated "quiet" mode, in which all nodes 100 except the node issuing the MPC refrains from sending packets over the communication channels 120a, 120b, until the restart is issued. For instance, the MPC may contain bits identifying the next schedule to be used, as well as bits instructing the receiving nodes 100 to switch to quiet mode in the present communication mode, and optionally, a number of subsequent communication modes. This way, it is possible to quickly switch between communication modes as well as keep selected nodes 100 quiet in communication modes in which such nodes are assigned slots in the TDMA schedule.

The communication controllers 104 of the nodes 100 as shown in FIG. 1 may be readily adapted to recognize the one or more MPCs. As the implementation of instruction decoding requires only routine skill for the person skilled in the relevant art, this will not be further explained for reasons of brevity only. Hence, the nodes 100 in the data communication network 10 may be readily adapted to form a data communication network in accordance with the present invention.

Figure 4:
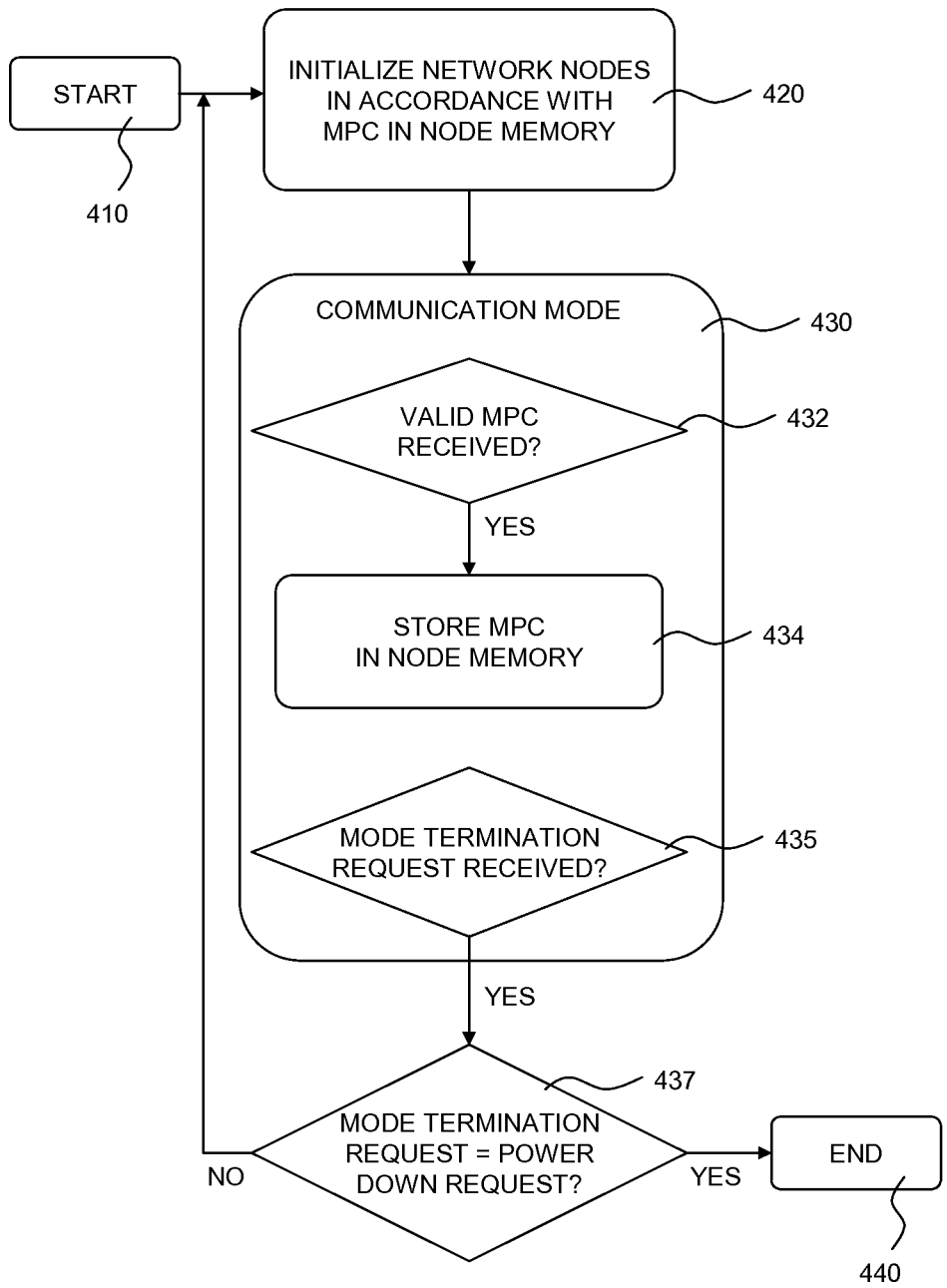
FIG. 4 schematically depicts a flowchart method of reconfiguring a data communication network in accordance with an embodiment of the present invention.

The serial data communication network of the present invention typically implements the method of the present invention, an exemplary embodiment of which is shown in FIG. 4. As the method has already been explained in detail above, FIG. 4 is used to summarize a preferred embodiment of this method.

The method 400 starts in step 410, after which the network 10 is initialized, e.g. by a (re)start, which may be caused by a power-up, reboot, wake-up and so on in step 420. This initialization includes the configuration of the nodes 100 in accordance with the state of their internal memory. In other words, if a valid MPC has been stored into the local memory of the nodes 100, the nodes will initialize in accordance with the communication mode identified by the MPC, which comprises at least loading the appropriate TDMA schedule. Such a schedule may be a partial schedule of the schedules shown in FIG. 3, i.e. comprise only entries relevant to that particular node 100. Upon completion of the initialization step 420, the network 10 typically enters a communication mode in step 430 during which nodes 100 communicate over the communication channels 120a, 120b during assigned time slots in the associated TDMA schedule such as schedule 32. Such a communication mode may have been specified by a MPC issued during a previous communication mode, i.e. prior to the restart of the network 10.

During the communication or programming cycle 430, which may be a normal communication cycle or a programming cycle, and so on, a MPC may be broadcasted to the nodes 100 in the serial data communication bus 10. If a valid MPC has been received by the nodes 100, as indicated by check step 432, the MPC will be stored in each node 100 as indicated by step 434, e.g. in a local memory, which may be a RAM memory in case the nodes 100 are never fully powered down or a flash memory in case power supply to the nodes is completely terminated in a powered down state. Other suitable memory types may of course also be used.

The method 400 proceeds with the communication cycle 430 until a mode termination event causes the communication cycle 430 to be terminated. Such a termination event may be a re-initialization request to enter a new communication mode, a power-down request, a reboot request and so on. If the network is to be restarted, e.g. re-initialized, as checked in step 437 (this is of course normally the case), the method reverts back to step 420 in which the network is re-initialized. If, on the other hand, a complete power-down is requested, the method 400 terminates in step 440, after which a full power up may cause the method 400 to restart in step 410.

In case the method reverts back to step 420, because the MPC has been stored in the configuration memory of the nodes 100, upon the nodes 100 re-initializing in step 420, the nodes will select the configuration information as specified by the MPC, thus ensuring that all nodes 100 enter the same communication mode as selected by the MPC. As previously explained, this obviates the need to combine multiple scenarios, e.g. use-cases, into a single communication cycle, thereby improving the bandwidth available to the nodes 100 during any one of such cycles.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of switching modes in a TDMA (time-divisional multiple access) serial data communication network having a plurality of interconnected nodes, the method comprising:
   during a first mode, issuing an instruction to said nodes, wherein each of said nodes includes a plurality of mode-dependent configurations in which the mode-dependent configurations of said nodes comprise different TDMA schedules for identifying time slots in which the corresponding node has been granted access to the TDMA serial data communication network, said instruction identifying a next mode of the data communications network, wherein the instruction is broadcasted to said nodes in a same time slot in the different TDMA schedules;
   terminating said first mode; and
   following said termination of said first mode, reconfiguring each of said nodes in accordance with the configuration corresponding to said next mode identified by said instruction,
   wherein the plurality of interconnected nodes are instructed to select a same TDMA schedule at initialization or wake-up.

2. The method of claim 1, wherein the next mode is a programming mode for programming of said node.

3. The method of claim 1, wherein issuing said instruction comprises broadcasting said instruction.

4. The method of claim 1, wherein the different TDMA schedules include a first TDMA schedule and a second TDMA schedule, the first and second TDMA schedules comprise a time slot allocated to the issuance of said instruction.

5. The method of claim 1, wherein the data communication network is a FlexRay™ network, and wherein said nodes comprise a programmable electronic control unit.

6. The method of claim 5, wherein the instruction is embedded in one of a FlexRay™ symbol, a network management vector and a synchronization frame.

7. The method of claim 1, further comprising switching at least some of the nodes to a quiet state during said first mode upon reception of said instruction.

8. The method of claim 1, wherein the instruction comprises instruction bits as well as error-protection bits.

9. The method of claim 1, wherein said nodes each include an internal memory, the method further comprising:
   for each of said nodes receiving said instruction, storing said instruction into the internal memory; and
   wherein the step of reconfiguring each of said nodes comprises reading said instruction from the internal memory to identify the appropriate mode-dependent configuration.

10. The method of claim 1, wherein the next mode is a firmware reprogramming mode in which a majority of the time slots are allocated to reprogram firmware of the nodes.

11. The method of claim 10, wherein the different TDMA schedules include a first TDMA schedule and a second TDMA schedule, the first TDMA schedule comprises node-specific time slots assigned to the nodes and wherein the second TDMA schedule comprises node-specific time slots assigned to firmware reprogramming.

12. The method of claim 1, wherein the first TDMA schedule and the second TDMA schedule correspond to different bandwidth allocations.

13. The method of claim 1, wherein the first and second TDMA schedules are programmed as firmware within the nodes and wherein reconfiguring each of said nodes comprises selecting one of the first and second TDMA schedules.

14. The method of claim 1, wherein the first and second TDMA schedules comprise a time slot allocated to the issuance of said instruction and wherein said instruction is a Mode Preset Command (MPC).

15. A TDMA (time-divisional multiple access) serial data communication network comprising:
   a plurality of interconnected nodes, at least some of said nodes including a plurality of mode-dependent configurations, wherein the mode-dependent configurations of said nodes comprise different TDMA schedules for identifying time slots in which the corresponding node has been granted access to the TDMA serial data communication network, wherein the instruction is broadcasted to said nodes in a same time slot in the different TDMA schedules, wherein said nodes are configured to:
   receive an instruction during a first mode of said network, said instruction identifying a next mode of the said network: and
   upon a restart of the network, initialize the nodes by loading the configuration as identified in said instruction, wherein the plurality of interconnected nodes are instructed to select a same TDMA schedule at initialization or wake-up.

16. The serial data communication network of claim 15, wherein the nodes each comprise an internal memory for storing the instruction during said first mode.

17. The serial data communication network of claim 15, wherein the serial data communication network is a FlexRay™ network.

18. A vehicle comprising a serial data communication network as claimed in claim 15.

19. The serial data communication network of claim 15, wherein the first and second TDMA schedules are programmed as firmware within the nodes, wherein the first and second TDMA schedules correspond to different bandwidth allocations, and initializing the nodes comprises selecting one of the first and second TDMA schedules.

* * * * *